Nov. 13, 1923.　　　　　　　　　　　　　　　　　　1,473,910
F. LAMBERT
YIELDABLE JOINT FOR WATER METERS AND THE LIKE
Filed Dec. 30, 1921
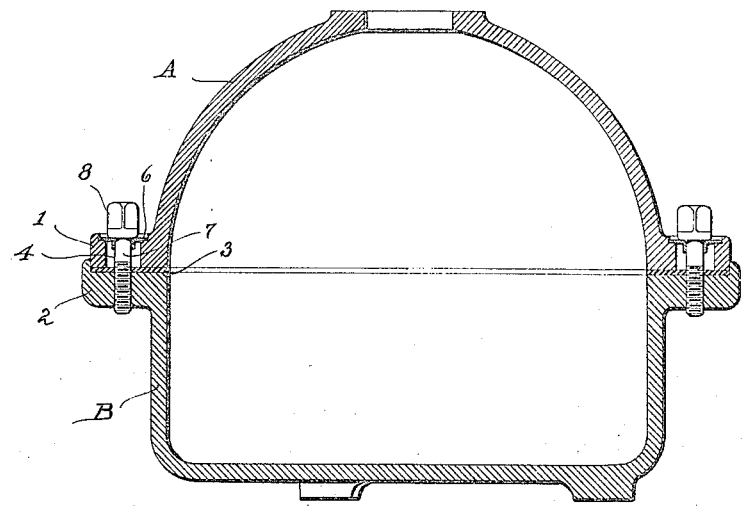
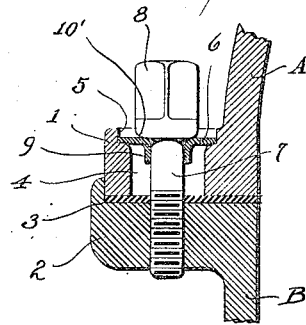 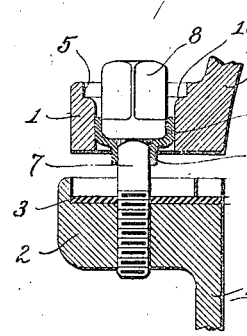 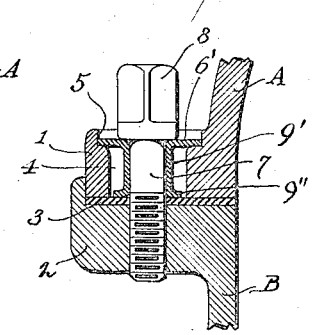
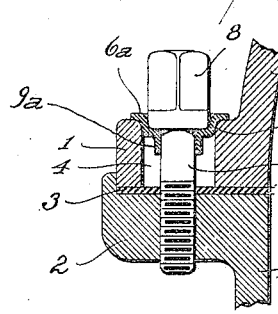 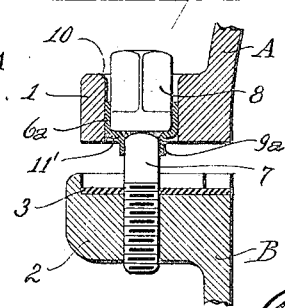
Frank Lambert
INVENTOR.
BY
A. Alexander Thomas
ATTORNEY.

Patented Nov. 13, 1923.

1,473,910

UNITED STATES PATENT OFFICE.

FRANK LAMBERT, OF BROOKLYN, NEW YORK.

YIELDABLE JOINT FOR WATER METERS AND THE LIKE.

Application filed December 30, 1921. Serial No. 526,042.

*To all whom it may concern:*

Be it known that I, FRANK LAMBERT, a citizen of the United States, and a resident of Brooklyn, county of Kings, and State of New York, have invented certain new and useful Improvements in Yieldable Joints for Water Meters and the like, of which the following is a full, clear, and exact specification.

My invention relates generally to yieldable joints and is particularly adapted for use in water-meter casings to permit separation of the casing parts under excessive pressure, as when the water in the meter freezes.

In carrying out the objects of my invention, I employ an element (usually a washer) of deformable or malleable material arranged to engage the head of a bolt or other fastening member and adapted to be drawn into an inoperative or releasing position when the casing is subjected to undue internal pressure. For the purpose of explaining my invention, I have shown the same applied to a water-meter casing, it being understood that the invention is not limited to such use.

In the accompanying drawings,

Fig. 1 is a transverse cross-section of a conventional form of water-meter casing provided with a preferred form of my new joint, the parts being shown in normal position;

Fig. 2 is an enlarged fragmentary view in cross-section of the joint shown in Fig. 1;

Fig. 3 is a view similar to Fig. 2, showing the position of the parts when the joint is separated;

Fig. 4 is a view similar to Fig. 2, showing a modified form of washer in which the flange extends to the gasket;

Fig. 5 is an enlarged fragmentary view in cross-section, showing another form of joint, the parts being in normal position; and Fig. 6 is a view similar to Fig. 5, showing the parts in separated position.

The meter casing shown in the drawings consists of sections A and B adapted to form a closed casing. It is obvious that any suitable form or construction of meter casing may be employed. The upper section A is provided with a flange 1 and the lower section B has a corresponding flange 2. A suitable gasket 3 is interposed between the flanges.

I will first describe the form of joint shown in Figs. 1, 2 and 3.

The flange 1 of the section A is provided with openings 4, suitably spaced around the circumference of the casing. The openings 4 are provided with countersinks 5 adapted to receive washers 6. Suitable fastening devices, such as bolts 7 having heads 8, pass through the holes in the washers 6 into screw-threaded holes in the flange 2 of the casing. The screw-threaded engagement between the bolts and the bolt holes in the flange 2 is preferably free and loose, so as to prevent the bolts from being strained and twisted when the casing separates under excessive internal pressure.

By countersinking the openings 4 and seating the washers 6 in the countersinks 5, the washers are automatically centralized with respect to the bolts 7 and openings 4. The washers 6 are preferably provided with hubs 9 around the hole, thereby affording better contact with the bolts.

The washers 6 are made of a material adapted to give way under excessive pressure. Broadly speaking, such material may be described as malleable or deformable, and I may mention brass, copper, pure tin or a composition of tin and lead. If the washers are made of brass and copper they can be annealed, so as to make them more malleable. The metals and alloys just mentioned are given here merely by way of illustration, for it is obvious that the washers may be made of any material, preferably not easily oxidizable, which yields or deforms under predetermined pressure.

The operation of my new joint is as follows: After the washers and bolts are in place in the assembling of the parts, the bolts 7 are tightened preferably to a predetermined limit. This may readily be accomplished by using a wrench which permits tightening of the bolts only a certain amount. An instance of such a "fixed-tension" wrench, as I may call it, is shown in my Patent No. 1,388,866, dated August 30, 1921. The size and thickness of the washers 6 are such that they safely withstand the normal pressure of the bolts 7. Under excessive pressure within the casing, as when the water in the meter freezes, the malleable or deformable washers 6 give way or collapse and are drawn into the openings 4 of the section A, as shown in Fig. 3. The openings 4 are large enough to receive the heads 8 of the bolts 7 and the deformed washers 6. To facilitate the deforming of the washers, the walls of the openings 4 may be rounded at the top, as shown at 10, and the lower edges of the bolt heads may be rounded at 10'. If the undue pressure in the casing increases sufficiently, the bolt heads 8 and washers 6 may be drawn clear through the openings 4, thus allowing sufficient separation of the casing parts under all abnormal conditions. This separation of the parts is necessary to compensate for the expansion due to the formation of ice and to prevent injury or deformation of the casing or internal mechanism of the meter. As this internal mechanism forms no part of my invention and is well understood by those skilled in the art, I have not deemed it necessary to show or describe the same.

In Fig. 4, the washer 6' is provided with a hub 9' having a flange 9'' adapted to rest on the gasket 3. This renders the use of a special or "fixed-tension" wrench unnecessary.

In the slightly modified form shown in Figs. 5 and 6, I do away with the countersinks for the openings 4 and provide the washers 6$^a$ with a centralizing shoulder 11 adapted to fit in the openings 4. The shoulder 11 may terminate in a hub 9$^a$ around the hole of the washer. As the operation of the washers 6$^a$ is the same as that of the washers previously described, no further description of Figs. 5 and 6 is necessary.

It will be seen from the foregoing that I have provided a very simple and inexpensive joint which automatically separates under excessive pressure. It is plain that the diameter of the openings 4 relatively to the diameter of the bolt heads 8 may be varied. The deformable washers will be elongated more or less according to the difference between those two diameters. Also, this difference of diameter can be adjusted in accordance with the hardness and thickness of the material of which the washers are made. In this way it is very easy to construct a joint in which the washers will yield under pressure beyond a predetermined limit.

Although I have herein shown and described a specific form of joint, it is obvious that the broad idea of my invention may be mechanically carried out in other ways than here set forth.

What I claim as my invention is:

1. A casing comprising two sections, one of said sections having a plurality of openings, deformable washers mounted over said openings, and headed fastening members passing through said washers and openings into engagement with the other section, said openings being so much larger than the heads of said members that under excessive pressure said washers and heads are forced into or through said openings.

2. A casing comprising two sections, one of said sections having a plurality of openings, deformable washers mounted over said openings, means for holding each washer centrally over the corresponding opening, and headed fastening members passing through said washers and openings into engagement with the other section, said openings being so much larger than the heads of said members that under excessive pressure said washers and heads are forced into or through said openings.

3. In a yieldable joint, a pair of joint members, a bolt extending through an opening in one member into engagement with the other member, and a deformable element arranged in said opening and adapted to be drawn into the opening under excessive pressure.

4. In a yieldable joint, a pair of joint members, a bolt extending through an opening in one member into engagement with the other member, a deformable element arranged in said opening and adapted to be drawn into the opening under excessive pressure, and means for holding said element centrally over the opening.

5. A casing comprising two sections, one of said sections having a plurality of openings, deformable washers mounted over said openings, said washers being provided with a hub around the hole thereof, and headed fastening members passing through said washers and openings into engagement with the other section, said openings being so much larger than the heads of said members that under excessive pressure said washers and heads are forced into or through said openings.

6. A casing comprising two sections, one of said sections having a plurality of openings, deformable washers mounted over said openings and provided with centralizing shoulders, and headed fastening members passing through said washers and openings into engagement with the other section, said openings being so much larger than the heads of said members that under excessive pressure said washers and heads are forced into or through said openings.

7. In a yieldable joint, a pair of joint members, bolts for holding said members together, and bendable washers interposed between the heads of said bolts and one of said members in such a way that under excessive pressure the bolt heads bend the outer periphery of the washers out of holding engagement with said member to permit separation of the joint members.

8. In a yieldable joint, a pair of joint members, one of said members having a circular engaging shoulder, a deformable washer so arranged on said last-mentioned member as to engage said member only along said circular shoulder at the outer edge or periphery of the washer, and means operable under excessive pressure for removing the outer edge of said washer from said shoulder and thereby rendering the holding engagement between said last-mentioned member and said washer inoperative to permit separation of said members.

9. A casing comprising two sections, a gasket interposed between said sections, one of said sections having a plurality of openings, bolts extending through said openings into engagement with the other section, and deformable washers mounted in said openings and provided with hubs adapted to rest on said gasket, said washers being adapted to be drawn into said openings under excessive pressure in the casing.

10. A casing comprising two sections, a gasket interposed between said sections, one of said sections having a plurality of openings, bolts extending through said openings into engagement with the other section, and deformable washers mounted in said openings and provided with hubs which terminate in flanges adapted to rest on said gasket, said washers being adapted to be drawn into said openings under excessive pressure in the casing.

FRANK LAMBERT.